United States Patent [19]

Bobeck et al.

[11] 3,710,356

[45] Jan. 9, 1973

[54] STRIP DOMAIN PROPAGATION ARRANGEMENT

[75] Inventors: Andrew Henry Bobeck, Chatham, N.J. 07928; Robert Frederick Fischer, Livingston, N.J. 07039

[73] Assignee: Bell Telephone Laboratories, Incorporated, Murray Hill, N.J.

[22] Filed: Sept. 8, 1971

[21] Appl. No.: 178,692

[52] U.S. Cl. ........................340/174 TF, 340/174 SR

[51] Int. Cl. ..........................G11c 11/14, G11c 19/00

[58] Field of Search ................................340/174 TF

[56] References Cited

UNITED STATES PATENTS 3,555,527 1/1971 Perneski ........................340/174 TF

OTHER PUBLICATIONS

Scientific American "Magnetic Bubbles" by Bobeck et al., 6/71, pages 78–90.

IBM Technical Disclosure Bulletin, "Fan-Out for Bubble Domain Devices" by Almasi, Vol. 13, No. 6, 11/70, p. 1409.

*Primary Examiner*—Stanley M. Urynowicz, Jr.

*Attorney*—R. J. Guenther et al.

[57] ABSTRACT

Single wall domains have been found to be movable in a host magnetic layer in the absence of a bias field and in the absence of sufficient coercivity in the host layer for maintaining the domain walls in fixed positions when drive fields terminate.

10 Claims, 3 Drawing Figures

STRIP DOMAIN PROPAGATION ARRANGEMENT

Field of the Invention

This invention relates to data processing arrangements and more particularly to such arrangements in which information is represented as single wall domains.

Background of the Invention

The term "single wall domain" refers to a magnetic domain which is movable in a layer of a suitable magnetic material and is encompassed by a single domain wall which closes on itself in the plane of that layer.

Propagation arrangements for moving a domain are designed to produce magnetic fields of a geometry determined by the layer in which a domain is moved. Most materials in which single wall domains are moved are characterized by a preferred magnetization direction, for all practical purposes, normal to the plane of the layer. The domain accordingly constitutes a reverse magnetized domain which may be thought of as a dipole oriented transverse, nominally normal to the plane of the layer. Accordingly, the movement of a domain is accomplished by the provision of an attracting magnetic field normal to the layer and at a localized position offset from the position occupied by the domain. A succession of such fields causes successive movements of a domain as is well known.

One propagation arrangement comprises a pattern of electrical conductors each designed to form conductor loops which generate the requisite fields when externally pulsed. The loops are interconnected and pulsed in a three-phase manner to produce shift register operation as disclosed in A. H. Bobeck, U. F. Gianola, R. C. Sherwood, W. Shockley U.S. Pat. No. 3,460,116 issued Aug. 5, 1969.

An alternative propagation arrangement employs a pattern of soft magnetic elements adjacent the surface of a layer in which single wall domains are moved (or a pattern of grooves in the surface). In response to a magnetic field reorienting in the plane of the layer, changing pole patterns are generated in the elements. The elements are arranged to displace domains along a selected path in the layer as the in-plane field reorients. The familiar T- (or Y-) bar overlay arrangement, for example, responds to a rotating in-plane field to so displace domains. Arrangements of this type are called "-field access" arrangements and are disclosed in A. H. Bobeck U.S. Pat. No. 3,534,347 issued Oct. 13, 1970. Regardless of the mode of propagation, localized magnetic field gradients cause domain movement. In the field access mode, those gradients are caused by the generation of attracting and repelling poles in the overlay elements due to the in-plane fields.

Typically, the field access mode requires a pattern of elements for moving domains simultaneously along parallel channels where the movement of domains from one channel to another is not permitted by the design of the pattern. To be specific, the elements of the pattern which define adjacent stages of a channel are spaced apart at least three domain diameters in order to avoid undesirable domain interactions. The elements which define adjacent channels are similarly spaced apart. Not only are the spacings above a minimum, but typical overlay geometries are designed to generate repelling poles between channels thus reducing the opportunity for channel to channel movement.

On the other hand, copending application Ser. No. 160,841 filed July 8, 1971 for A. H. Bobeck and H. E. D. Scovil describes a fine grained overlay pattern in which elements of adjacent channels are closely spaced and of a geometry to permit lateral movement of domains. In an embodiment of that invention, a chevron pattern of V-shaped elements are spaced apart distances less than a nominal domain diameter maintained by a bias field. Depending on the value of the bias field and the drive (in-plane) field which determines the strength of the poles generated in the overlay pattern, the size of the domain propagated by the arrangement varies.

BRIEF DESCRIPTION OF THE INVENTION

It has been discovered that fine grained overlay geometries permit the movement of single wall domains in a layer of host magnetic material in an unexpected manner where the operation is not dominated by the coercivity of the layer and in the absence of a bias field.

In one embodiment of this invention, a multistage domain propagation arrangement is defined by a repetitive chevron pattern in a layer of material in which single wall domains can be moved in the presence of a bias field. In the absence of a bias field a single wall domain strips out adjacent each side of the repetitive chevron pattern, fingers extending inwardly from each such strip domain towards the other along lines of attracting poles generated in the elements of the chevron by an in-plane field.

The resulting domain configuration appears like two combs with backing members and interleaved teeth. Consecutive reorientations of the in-plane field move the teeth from stage to stage in a manner to preserve the connection between the teeth and the backing member at which they originate. Conductor loops overlaping the backing members at input positions extend domain walls inwardly from the associated backing domain when pulsed, thus generating teeth domains representative of information. Detection is achieved, for example, by a localized field which attempts to shrink a tooth domain at an output position associated with one backing domain to permit unobstructed detection of a tooth domain associated with the other backing domain by a detector adjacent that other backing domain.

The backing domains are maintained in fixed positions during operation conveniently by magnetically soft bars.

DETAILED DESCRIPTION

Figure 1:
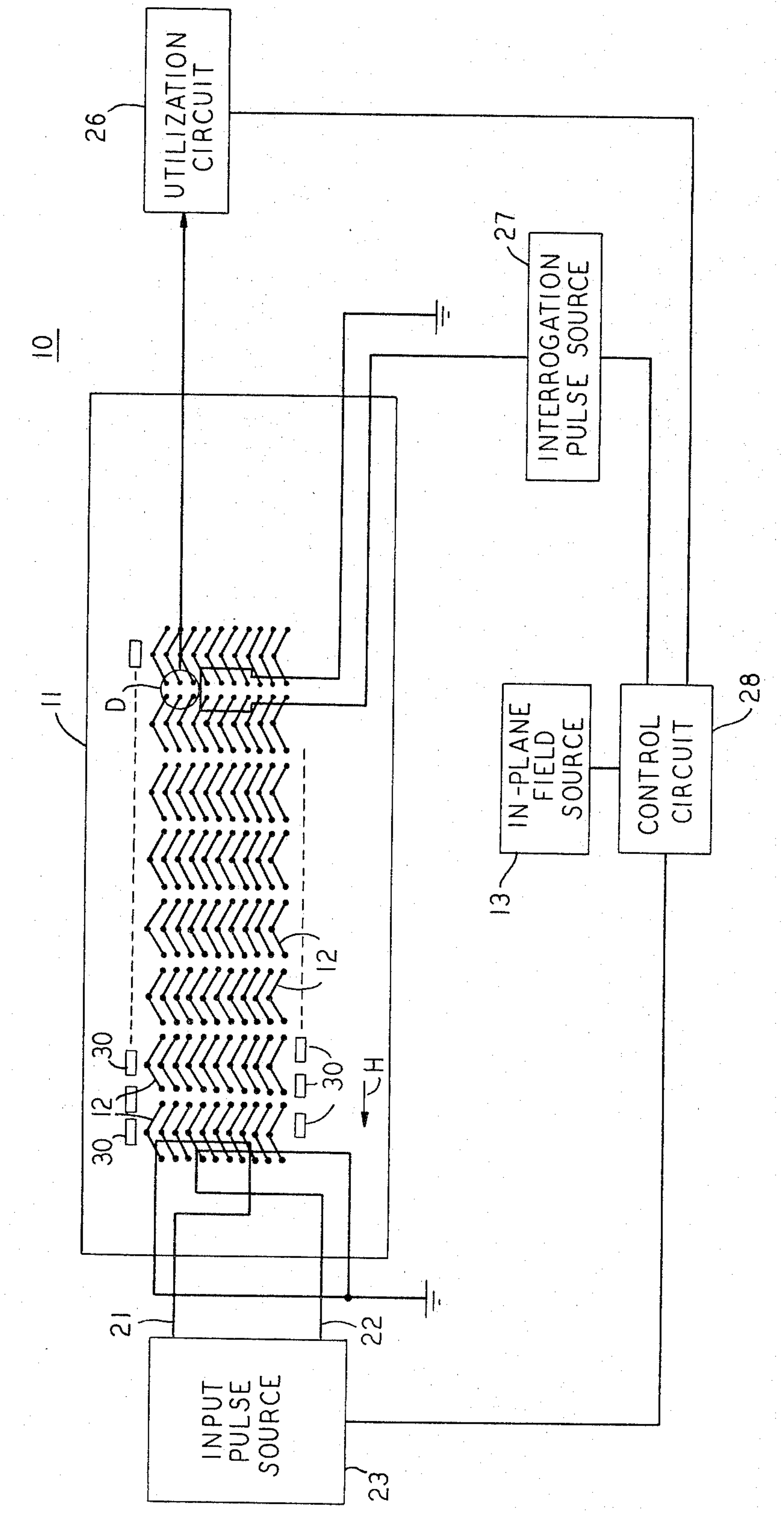
FIG. 1 is a schematic representation of a domain propagation arrangement in accordance with this invention.

FIG. 1 shows a magnetic domain arrangement 10 in accordance with this invention. The arrangement comprises a layer 11 of a magnetic material in which single wall domains can be moved and a fine grained pattern of elements 12 which is operative to move domalns in the layer in response to a reorienting in-plane field. The illustrative pattern is of a chevron form with element spaced apart less than the collapse diameter of a single wall domain in layer 11 and is operative to move domains from left to right in response to a clockwise rotating in-plane field. Block 13 of FIG. 1 represents a suitable source of an in-plane field.

Single wall domain devices are known to be operative in two modes. One is the coercivity dominated mode where the coercive force of layer 11 is sufficiently high to retain a domain in a position to which it is moved when the drive field is terminated. Domains, in this mode, may be of any shape. The other mode is the bias dominated mode is which domains in the shape of right circular cylinders are maintained at some nominal diameter by a uniformly applied bias field of a polarity to constrict the domains. In this mode, the coercive force is usually so low that in the absence of a bias field, domains strip out uncontrollably. But in any case, the coercive force of the material is incidental to the operation.

In accordance with the illustrative embodiment of this invention, layer 11 has a coercive force such that in the absence of the fine grained pattern and a bias field, domains strip out uncontrollably. Consequently, the arrangement would normally fall into the category of a bias dominated mode. But operation in accordance with this invention is in the absence of a bias field. As would be expected in this situation, domains strip out.

The overlay pattern, in the other hand, imposes its own constraints on the shape of the domains. Rather than stripping out uncontrollably, domains strip out horizontally, as viewed, along the lower and upper edges of the chevron pattern as indicated at 18 and 19 in FIG. 2. Also, finger domains *f*1, *f*2,–*f*N extend inwardly from the horizontal domains forming what resembles a pair of comb structures with interleaved teeth. If we designate the teeth originating at horizontal domain 18 as representing binary ones and those originating at horizontal domain 19 as representing binary zeros we may recognize the information represented by the fingers of FIG. 2 being 110011001 reading from left to right.

Figure 2:
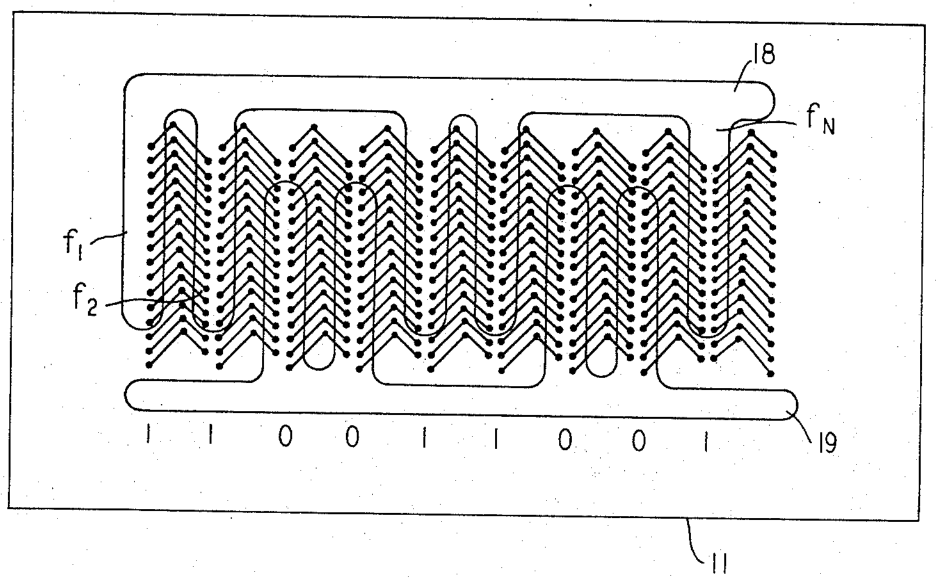
FIGS. 2 and 3 are schematic representations of alternative portions of the arrangement of FIG. 1.

In response to a clockwise rotating in-plane field, and in the absence of a bias field, the finger domains move from left to right as viewed in FIG. 2 following the waves of attracting poles generated in the fine grained pattern of elements 12 in a manner analogous to that described in the above-mentioned copending application.

It is well known that single wall domains repel one another. Inasmuch as domains 18 and 19 with their fingers comprise single wall domains, repulsion forces exist therebetween. Consequently, the "fingers" of one backing domain do not extend all the way to the other. Instead, the finger domains terminate short of that backing domain typically a distance equal to the collapse diameter of a domain in layer 11.

Finger domains representative of information are introduced to the left as viewed in FIG. 1 by pulses selectively applied to hairpin shaped conductors 21 and 22. A pulse on either of these conductors distorts an associated backing domain (18 or 19) extending a finger inwardly therefrom. The conductors, are connected between an input pulse source represented by block 23 of FIG. 1 and ground. An input pulse occurs when the in-plane field is oriented to the left as represented by arrow H in FIG. 1 to generate a pattern of attracting poles to the left of each overlay element. The finger domain extended by the input pulse is positioned to correspond to these poles and thus is positioned properly for movement to the right as the in-plane field reorients.

Figure 3:
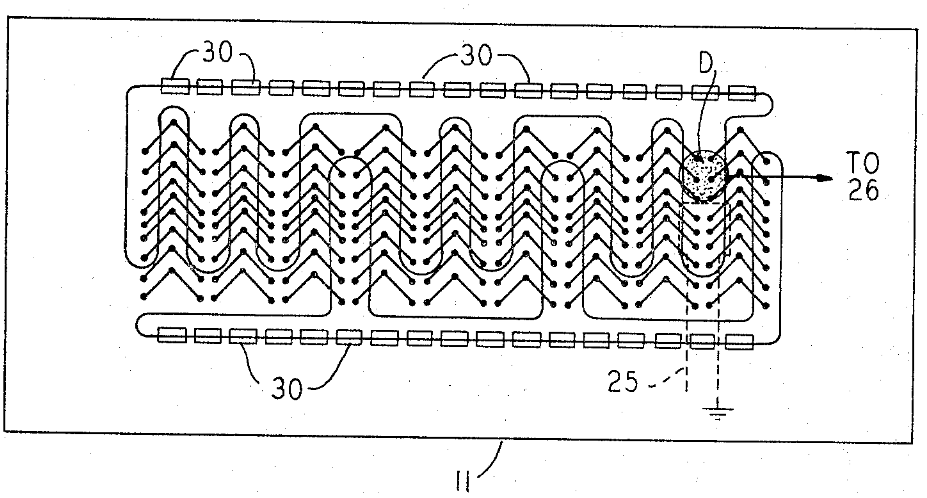

Finger domains so introduced and moved to the right appear at the right edge of the chevron pattern where detection conveniently occurs. Since the fingers stop short of one backing domain, the appropriate positioning of a suitable detector such as the familiar magnetoresistance device permits detection of only those domains associated with one backing domain and not the other. Also, an interrogate conductor 25 of FIG. 3 can be arranged to shrink a domain associated with one backing domain when pulsed, thus permitting detection of domains associated with only the other backing domain. FIG. 3 shows conductor 25 arranged to shrink fingers associated with domain 19 when pulsed.

Detection of the finger domains associated with backing domain 18 occurs at D in FIG. 3, the resulting signal being applied to utilization circuit 26 of FIG. 1. A pulse is applied to conductor 25 by an interrogate pulse source represented by block 27 of FIG. 1. Domains shrunk and detected as described continue to the right as viewed in FIG. 3, as the in-plane field reorients, to positions where they become absorbed into the respective backing domains normally during operation.

Sources 13, 23, and 27, and circuit 26 are connected to a control circuit 28 for synchronization and activation. The various sources and circuits may be any such elements capable of operating in accordance with this invention.

The foregoing operation depends on being able to initialize the arrangement of FIG. 1 so that backing domains 18 and 19 are provided in the fixed positions shown. For this purpose, a magnetically soft bar or series of square or round dots 30 shown in FIG. 3, is provided to the top and bottom of the chevron pattern. In each instance, a domain is set permanently at the leftmost dot, as viewed in FIG. 3, by for example, making those dots of high coercive force material or by providing a material defect there. Under zero bias conditions and with a low coercive force layer 11 (0.5 oersteds), the permanent domains strip out to encompass the associated series of dots 30 thus forming domains 18 and 19. In the presence of an in-plane field, a finger domain is generated initially for each period of the chevron pattern. But the fingers originate from domains 18 and 19 randomly and thus do not represent information. Information is entered into the arrangement, after initialization, by the selective pulsing of conductors 21 or 22 as described above.

After this initialization of the circuit, the inplane field may be removed without losing the finger domains.

The dots 30 are positioned to correspond to the peaks (and recesses) of associated chevrons illustratively as shown in FIG. 3. Of course, an increasingly larger number of dots can be used until the spacing therebetween vanishes and a solid bar is formed. The dots provide flux closure paths for domains and thus represent a low energy position for domain walls.

Several alternative chevron geometries are shown in FIGS. 1–3. FIG. 1 shows a uniform chevron pattern with elements each having equal length legs and having equal spacings between elements whereas FIGS. 2 and 3 show elements with unequal legs and unequal spacings respectively. Moreover, all of the elements in all of the FIGS. are shown with enlarged ends for flux concentrating purposes as disclosed in copending application Ser. No. 143,347 filed May 14, 1971 for A. H. Bobeck. The various patterns are typical of alternative overlay geometries which permit propagation of elongated single wall domains (commonly known as strip domains) which cooperate with pinning cites 30 to move finger domains under zero bias conditions as described.

Alternatives to the high permeability dots 30 serve the purpose of pinning backing domains also. For example, the host layer may be grooved along the positions of the dots as shown in FIG. 3 or a series of permanent magnets may be used.

One specific arrangement in accordance with this invention has been operated to move finger domains as described in a layer of $Er_2$, $Gd_1$, $Al_{0-4}$, $Fe_{4.6}$, $O_{12}$ garnet, 5 microns thick in which single wall domains exhibit collapse diameters of 8 microns and having a coercive force of 0.5 oersted. A chevron pattern of 12 rows of the type shown in FIG. 1 was formed by photoresist techniques on a spacing layer of 0.3 microns thick. Adjacent rows of the chevron pattern were on 4.2 micron centers, and each element of the pattern was 1.4 microns wide by 0.3 microns thick of permalloy having a coercive force of 0.5 oersted. The pattern had a period of 25 microns. Permalloy dots having diameters of 2.8 microns and thicknesses of 0.3 microns were deposited along with the chevron pattern, spaced apart therefrom distances of 3.2 microns as shown in FIG. 1. Under zero bias conditions as described, layer 11 assumed a demagnetized condition which in the area of the chevron pattern appeared as shown in FIG. 3 with domains 18 and 19 occupying the areas shown with finger domains extending inwardly therefrom in random fashion. Pulses having amplitudes of 50 milliamperes and durations of 5 micro seconds in conductors 21 and 22 generated fields of 10 oersteds for producing finger domains 30 microns long stopping short of the opposite backing domain a distance of 13 microns. A rotating in-plane field of 25 oersteds advanced domains so generated from left to right as viewed in FIG. 1.

A detector positioned as shown in FIG. 3 provides outputs of 100 $\mu$V for each finger domain associated with domain 18 and only a negligible output for each finger domain associated with domain 19.

What has been described is considered only illustrative of the principles of this invention. Therefore, various modifications thereof can be devised by those skilled in the art in accordance with those principles within the spirit and scope of this invention.

What is claimed is:

1. An arrangement comprising a layer of magnetic material in which single wall domains having a first diameter can be moved, a periodic pattern of elements for defining in said layer a multistage propagation channel for moving said domains therealong in response to a magnetic field reorienting in the plane of said layer, a plurality of said elements in each of said stages being spaced apart laterally with respect to one another distances of less than about said first diameter, and means for fixing the position of first and second strip domains adjacent first and second sides of said pattern.

2. An arrangement in accordance with claim 1 wherein said means for positioning comprises means for providing flux closure paths for strip domains extending along said first and second sides.

3. An arrangement in accordance with claim 2 wherein said means for positioning comprises first and second sets of magnetically soft elements spaced apart from said first and second sides respectively.

4. An arrangement in accordance with claim 3 also including means for extending finger domalns from said first and second strip domains respectively across said pattern of elements at an input one of said stages.

5. An arrangement in accordance with claim 3 also including means for detecting the presence or absence of a finger domain associated with said first strip domain.

6. An arrangement in accordance with claim 5 wherein said pattern comprises a repetitive chevron pattern of V-shaped elements.

7. An arrangement in accordance with claim 6 also including means for providing a magnetic field reorienting in the plane of said layer for moving said finger domains along said pattern.

8. An arrangement in accordance with claim 7 wherein said magnetic field reorients by rotation.

9. An arrangement comprising a layer of material in which single wall domains can be moved, a patter of elements for defining in said layer a multistage channel for moving said domains along an axis thereof in response to a magnetic field reorienting in the plane of said layer, a plurality of said elements in each of said stages being closely spaced laterally with respect to one another and of a geometry to move strip domains therealong in response to said field, and means for fixing the position of a strip domain adjacent each side of said pattern of elements.

10. An arrangement in accordance with claim 9 also including means for extending the domain wall encompassing said strip domain locally into a portion of said layer coupled by said elements at an input one of said stages.

* * * * *